US 8,036,193 B2

(12) United States Patent
Godfrey

(10) Patent No.: US 8,036,193 B2
(45) Date of Patent: *Oct. 11, 2011

(54) ADVANCE NOTIFICATION OF TRANSMIT OPPORTUNITIES ON A SHARED-COMMUNICATIONS CHANNEL

(75) Inventor: Timothy Gordon Godfrey, Overland Park, KS (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/691,693

(22) Filed: Jan. 21, 2010

(65) Prior Publication Data

US 2010/0118853 A1 May 13, 2010

Related U.S. Application Data

(63) Continuation of application No. 10/680,876, filed on Oct. 8, 2003, now Pat. No. 7,653,031.

(60) Provisional application No. 60/452,310, filed on Mar. 5, 2003.

(51) Int. Cl.
*H04W 74/00* (2009.01)

(52) U.S. Cl. ............... 370/338; 370/462; 455/552.1

(58) Field of Classification Search .............. None
See application file for complete search history.

(56) References Cited

U.S. PATENT DOCUMENTS

| 6,894,988 | B1 | 5/2005 | Zehavi |
| 6,895,255 | B1 | 5/2005 | Bridgelall |
| 6,909,705 | B1* | 6/2005 | Lee et al. ............... 370/338 |
| 6,990,082 | B1 | 1/2006 | Zehavi et al. |
| 7,193,965 | B1 | 3/2007 | Nevo et al. |
| 7,523,205 | B1* | 4/2009 | Sherman ............... 709/226 |
| 7,653,031 | B2 | 1/2010 | Godfrey |
| 2001/0010689 | A1 | 8/2001 | Awater et al. |
| 2003/0021250 | A1 | 1/2003 | Willins et al. |
| 2003/0108062 | A1* | 6/2003 | Agrawal et al. ............... 370/463 |
| 2004/0022210 | A1* | 2/2004 | Frank et al. ............... 370/328 |
| 2004/0162023 | A1 | 8/2004 | Cho |
| 2005/0025104 | A1 | 2/2005 | Fischer et al. |
| 2005/0026637 | A1 | 2/2005 | Fischer et al. |
| 2005/0250448 | A1 | 11/2005 | Knauerhase et al. |
| 2006/0002357 | A1 | 1/2006 | Sherman |
| 2006/0211372 | A1* | 9/2006 | Shellhammer et al. ...... 455/41.2 |
| 2006/0282518 | A1* | 12/2006 | Karaoguz et al. ............. 709/221 |
| 2007/0058665 | A1 | 3/2007 | Ho et al. |

FOREIGN PATENT DOCUMENTS

EP 1119137 A1 7/2001

(Continued)

OTHER PUBLICATIONS

International Preliminary Report on Patentability on PCT/US2004/006671, issued Sep. 9, 2005.

(Continued)

*Primary Examiner* — Min Jung

(57) ABSTRACT

A technique is disclosed that enables both an IEEE 802.11 transceiver and a Bluetooth transceiver to be employed in a single wireless telecommunication station (e.g., a device supporting a wireless telephone, personal digital assistant, etc.) without interfering on each other. In particular, the illustrative embodiment enables standard "off-the-shelf" IEEE 802.11 and Bluetooth transceivers to work in a coordinated fashion in a single telecommunications terminal. In the illustrative embodiment, an IEEE 802.11 transceiver that uses a shared-communications channel notifies a Bluetooth transceiver that a transmit opportunity exists and that the Bluetooth transceiver has permission to use the shared-communications channel. The technique disclosed is also applicable to communications protocols other than IEEE 802.11 and Bluetooth.

32 Claims, 9 Drawing Sheets

FOREIGN PATENT DOCUMENTS

| | | |
|---|---|---|
| EP | 1199842 A2 | 4/2002 |
| EP | 1207654 A2 | 5/2002 |

OTHER PUBLICATIONS

International Search Report for PCT Pat. App. No. PCT/US2004/006671, mailed on Aug. 23, 2004.

Shellhammer, "IEEE 802.15.2 Clause 14.1—Collaborative Coexistence Mechanism", IEEE P802.15 Working Group for Wireless Personal Area Networks, Jul. 9, 2001, available at: http://www.ieee802.org/15/pub/2001/Jul01/01340r0P802-15_TG2-Clause14-1.doc (last visited Feb. 19, 2010).

Godfrey, "802.11 and Bluetooth Coexistence Techniques", NWEC 2002, Nov. 6, 2002.

* cited by examiner

ADVANCE NOTIFICATION OF TRANSMIT OPPORTUNITIES ON A SHARED-COMMUNICATIONS CHANNEL

CROSS-REFERENCE TO RELATED APPLICATIONS

This application claims the benefit of:
1. U.S. provisional application Ser. No. 60/452,310, filed 5 Mar. 2003, entitled "Blue802 Advanced Notification of Idle Time", which is also incorporated by reference and
2. U.S. patent application Ser. No. 10/680,876, filed on Oct. 8, 2003, entitled "Advance Notification of Transmit Opportunities on a Shared-Communications Channel", which is also incorporated by reference.

The following patent applications are incorporated by reference:
1. U.S. patent application Ser. No. 10/444,383, filed May 23, 2003, entitled "Multi-Protocol Interchip Interface", now U.S. Pat. No. 7,072,616, issued Jul. 4, 2006,
2. U.S. patent application Ser. No. 10/444,519, filed May 23, 2003, entitled "Coordination of Competing Protocols", now U.S. Pat. No. 6,842,607, issued Jan. 11, 2005, and
3. U.S. patent application Ser. No. 10/680,877, filed Oct. 8, 2003, entitled "Coordinating Multiple Air-Interface Subsystems that Serve a Common Host,".

FIELD OF THE INVENTION

The present invention relates to telecommunications in general, and, more particularly, to wireless local area networks.

BACKGROUND OF THE INVENTION

FIG. 1 depicts a schematic diagram of local area network 100 in the prior art, which comprises telecommunication stations 101-1 through 101-K, wherein K is a positive integer, and shared-communications channel 102, interconnected as shown. Stations 101-1 through 101-K enable associated host computers to communicate blocks of data, or "frames," to each other. Stations 101-1 through 101-K comprise transceivers that enable communications via shared-communications channel 102.

In a mixed network such as local area network 100, some of the stations (e.g., station 101-1, etc.) operate in accordance with the IEEE 802.11 set of protocols, and some of the stations (e.g., station 101-4, etc.) operate in accordance with the Bluetooth set of protocols. Still other stations of local area network 100 operate in accordance with both protocols. The stations comprising transceivers that communicate in accordance with IEEE 802.11 are able to take turns accessing shared-communications channel 102 because they all embody IEEE 802.11 access rules and follow those rules. Similarly, the stations comprising transceivers that communicate in accordance with Bluetooth are able to take turns accessing shared-communications channel 102 because they all embody Bluetooth access rules and follow those rules.

When IEEE 802.11 transceivers and Bluetooth transceivers—situated either in separate stations or within the same station—have to use the same, shared-communications channel (i.e., shared-communications channel 102), the rules for accessing (and sharing) shared-communications channel 102 are not as well defined as for the case where all transceivers use the same protocol. For example, Bluetooth station 101-4 might attempt to transmit when IEEE 802.11 station 101-1 is already transmitting, and the result would most likely be that neither station successfully transmits during that particular attempt. Depending on the contention for shared-communications channel 102, neither the Bluetooth stations nor the IEEE 802.11 stations would operate effectively enough to be of much value to the end user.

Therefore, the need exists for a way to coordinate multiple air interface protocols that are used to access the same, shared-communications channel without some of the disadvantages in the prior art.

SUMMARY OF THE INVENTION

The present invention enables both an IEEE 802.11 transceiver and a Bluetooth transceiver to be employed in a single telecommunication station without the transceivers interfering on each other. In particular, the illustrative embodiment enables standard, "off-the-shelf," IEEE 802.11 and Bluetooth transceivers to work in a coordinated fashion in a single telecommunications station. In some embodiments, the two transceivers are in separate stations.

In the illustrative embodiment, an IEEE 802.11 transceiver that uses a shared-communications channel notifies a Bluetooth transceiver that a transmit opportunity exists and that the Bluetooth transceiver has permission to use the shared-communications channel. The channel access controller associated with the IEEE 802.11 transceiver determines the optimal times to relinquish control of the shared-communications channel to the Bluetooth transceiver, in part based on (i) the times of arrival of beacon frames and (ii) the information within each beacon frame. The IEEE 802.11 transceiver can choose to (i) power down or (ii) stay powered up when it relinquishes control of the shared-communications channel.

In this specification, the illustrative embodiment is disclosed in the context of the IEEE 802.11 and Bluetooth protocols; it will be clear to those skilled in the art, however, how to make and use alternative embodiments of the present invention for other combinations of competing protocols (i.e., protocols that might interfere with each other). In addition, although the illustrative embodiment is disclosed in the context of radio transceivers, it will be clear to those skilled in the art how to make and use alternative embodiments of the present invention for non-radio frequency wireless devices or wireline transceivers that might interfere with each other.

The illustrative embodiment of the present invention comprises: receiving at a first transceiver a beacon frame wherein the beacon frame comprises a beacon interval and wherein the first transceiver communicates in accordance with a first communications protocol using a shared-communications channel; determining a transmit opportunity on the shared-communications channel wherein the transmit opportunity is based on the time at which the beacon frame is received and on the beacon interval; and notifying a second transceiver of the transmit opportunity wherein the second transceiver communicates in accordance with a second communications protocol using the shared-communications channel.

DETAILED DESCRIPTION

Figure 1:
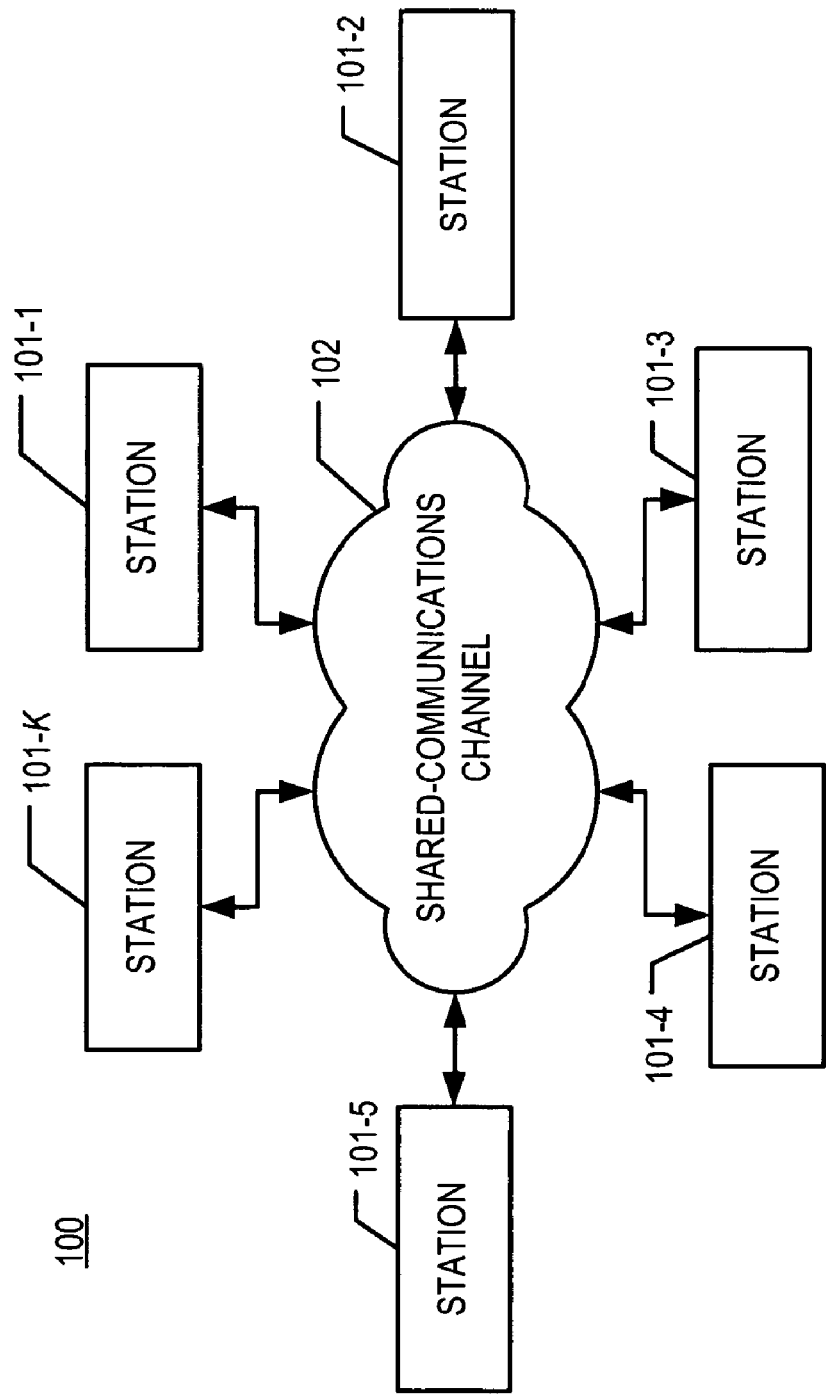
FIG. 1 depicts a schematic diagram of wireless local area network 100 in the prior art.
Figure 2:
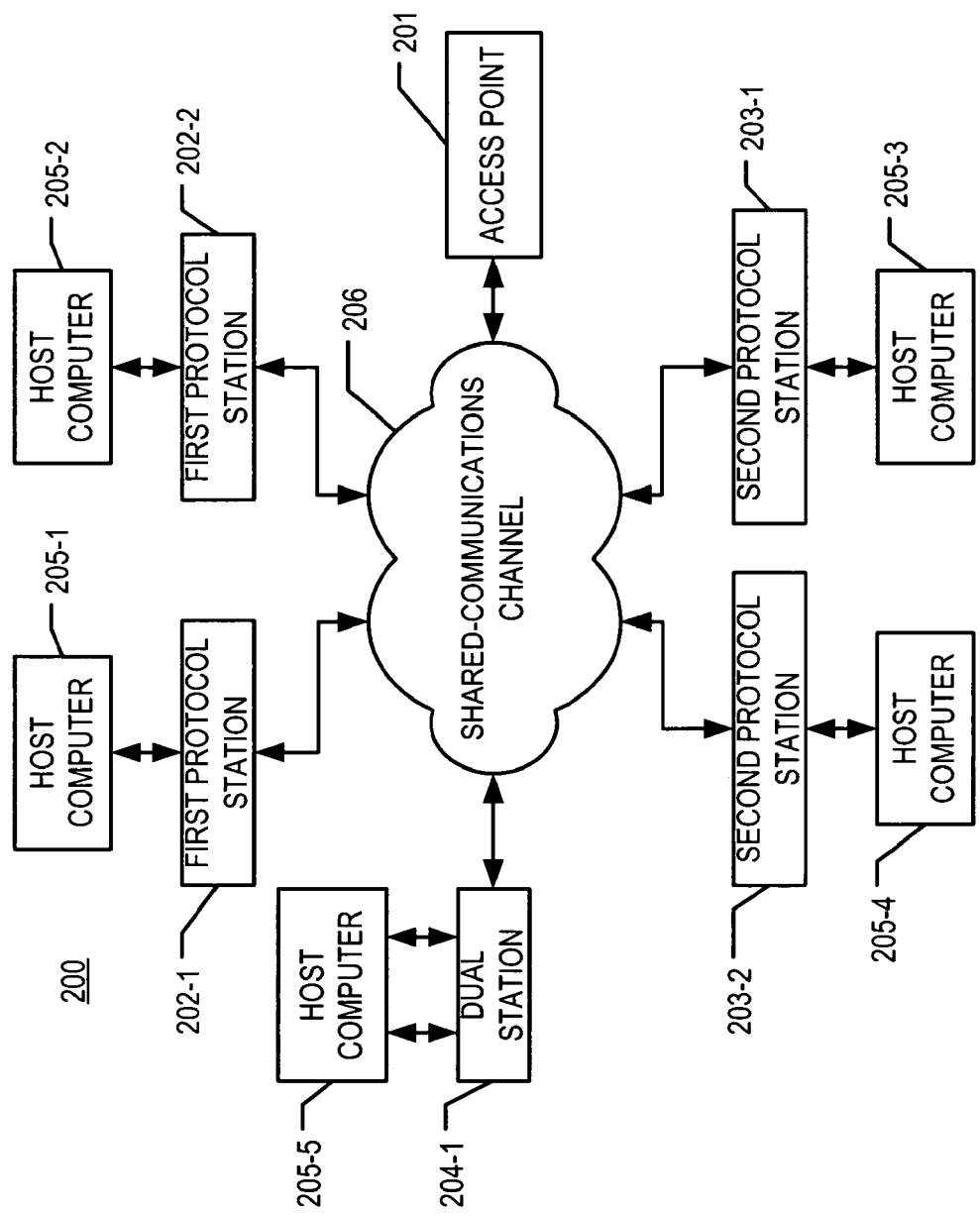
FIG. 2 depicts a schematic diagram of a portion of local area network 200 in accordance with the illustrative embodiment of the present invention.

FIG. 2 depicts a schematic diagram of a portion of local area network 200 in accordance with the illustrative embodiment of the present invention. Network 200 operates in accordance with the IEEE 802.11 and Bluetooth sets of protocols, and comprises access point 201, first protocol 802.11 stations 202-1 through 202-L, wherein L is a natural number; second protocol stations 203-1 through 203-M, wherein M is a natural number; dual protocol stations 204-1 through 204-N, wherein N is a natural number; host computers 205-1 through 205-P, wherein P is equal to the sum of L, M, and N; and wireless shared-communications channel 206, interconnected as shown.

FIG. 2 depicts a network configuration with L equal to two, M equal to two, and N equal to one. It will be clear, however, to those skilled in the art, after reading this specification, how to make and use embodiments of the present invention that use different values for L, M, and N.

In the examples provided in this specification, first protocol stations 202-1 through 202-L and second protocol stations 203-1 through 203-M are IEEE 802.11 and Bluetooth compliant, respectively. Furthermore, dual stations 204-1 through 204-N are both IEEE 802.11 and Bluetooth compliant. Access point 201, a coordinating station that is described below, is at least IEEE 802.11 compliant. In some embodiments, access point 201 is both IEEE 802.11 and Bluetooth compliant. It will be clear, however, to those skilled in the art, after reading this specification, how to make and use embodiments of the present invention that operate in accordance with other protocols. Furthermore, it will be clear to those skilled in the art, after reading this specification, how to make and use embodiments of the present invention that use a wireline or tangible shared-communications channel.

Access point 201 coordinates the communications of at least some of the stations within local area network 200. For example, first protocol stations 202-1 through 202-L and dual protocol stations 204-1 through 204-N, when using the protocol of first protocol stations 202-1 through 202-L, communicate with each other through access point 201. It will be clear to those skilled in the art how to make and use access point 201.

Each station comprises one or more transceivers that enable host computer 205-j, for j=1 to P, to transmit signals and receive signals via shared-communications channel 206. A "transceiver" is capable of two-way communication over a communications channel (e.g., shared-communications channel 206, etc.). For example, dual station 204-1 is capable of receiving data blocks from host computer 205-5 (i.e., the host computer with which dual station 204-1 is associated) and transmitting over shared-communications channel 206 data frames comprising the data received from host computer 205-5. Dual station 204-1 is also capable of receiving data frames from shared communications channel 206 and sending to host computer 205-5 data blocks comprising data from the data frames. It will be clear to those skilled in the art, after reading this specification, how to make and use dual station 204-1. The salient details for dual station 204-1 are described below and with respect to FIG. 3.

Host computer 205-j, for j=1 to P, is capable of generating data blocks and providing those data blocks to its associated station. Host computer 205-j is also capable of receiving data blocks from its associated station and of processing and using the data contained within those data blocks. Host computer 205-j can be, for example, a desktop computer, a laptop computer, a wireless telephone, or a personal digital assistant (PDA) that uses local area network 200 to communicate with other hosts and devices. It will be clear to those skilled in the art how to make and use host computer 205-j.

Figure 3:
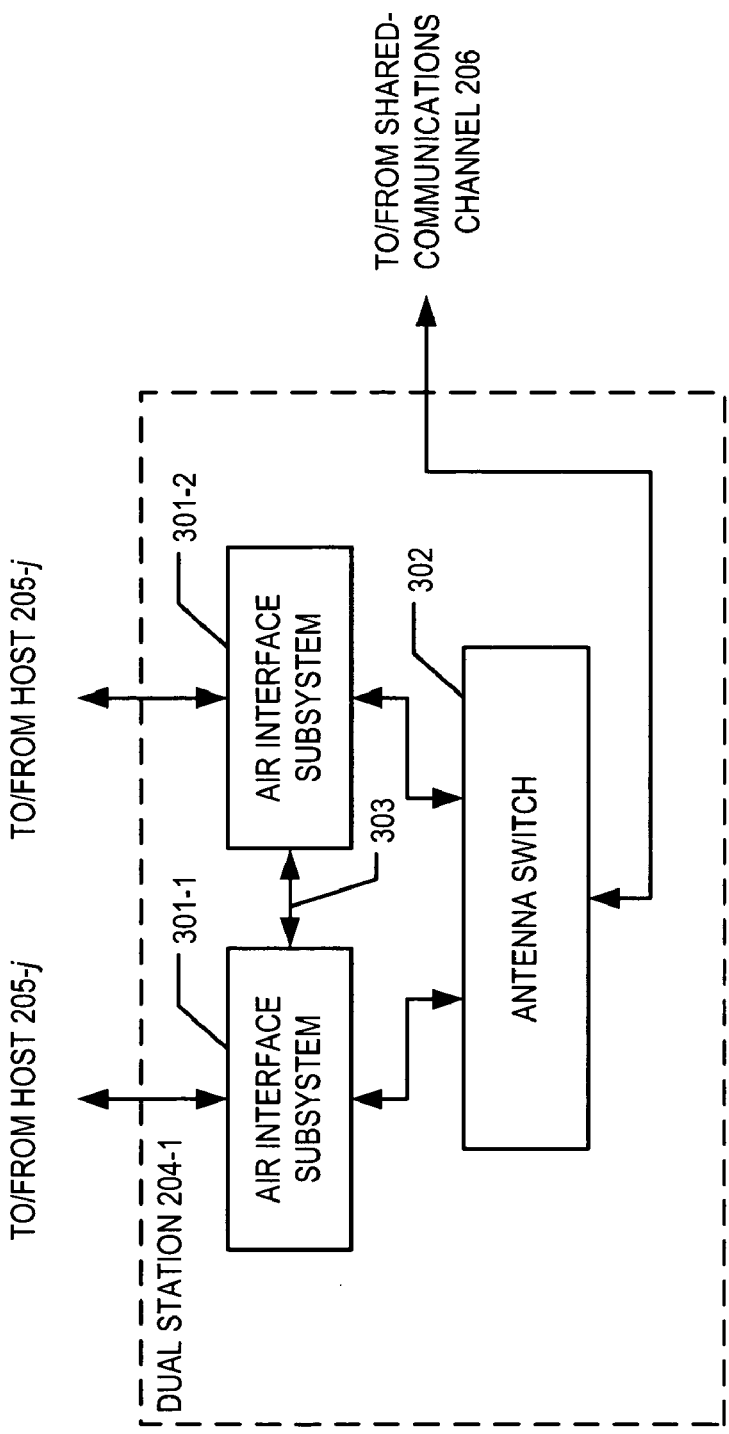
FIG. 3 depicts a block diagram of the salient components of dual station 204-1 in accordance with the illustrative embodiment of the present invention.

FIG. 3 depicts a block diagram of the salient components of dual station 204-1 in accordance with the illustrative embodiment of the present invention. Dual station 204-1 supports two distinct wireless air interface protocols for the purpose of transmitting and receiving data over the air via shared-communications channel 206. The wireless protocols supported by dual station 204-1 can be, for example, IEEE 802.11 and Bluetooth. Dual station 204-1 comprises: air interface subsystem 301-1, air interface subsystem 301-2, and antenna switch 302, interconnected as shown. Air interface subsystem 301-1 and air interface subsystem 301-2 communicate with each other via interface 303.

Air interface subsystem 301-i, for i=1 to Q wherein Q is a positive integer greater than one, enables associated host computer 205-j (i.e., host computer 205-5 paired with dual station 204-1) to communicate via shared-communications channel 206. In the illustrative example, Q is equal to two. It will be clear, however, to those skilled in the art, after reading this specification, how to make and use dual station 204-i with other values of Q.

Air interface subsystems 301-1 and 301-2 comprise the transceivers that enable host computer 205-j to communicate using two different air interface protocols. Each of air interface subsystems 301-1 and 301-2 operates in accordance with a different air interface protocol (e.g., IEEE 802.11, Bluetooth, etc.). It will be clear to those skilled in the art, after reading this specification, how to make and use air interface subsystems 302-1 and 302-2.

Antenna switch 302 enables air interface subsystems 301-1 and 301-2 to share a single antenna unit for the purpose of using shared-communications channel 206. Antenna switch 302 provides signals to air interface subsystem 301-i. Antenna switch 302 also accepts signals from air interface subsystem 301-i. It will be clear to those skilled in the art how to make and use antenna switch 302.

Figure 4:
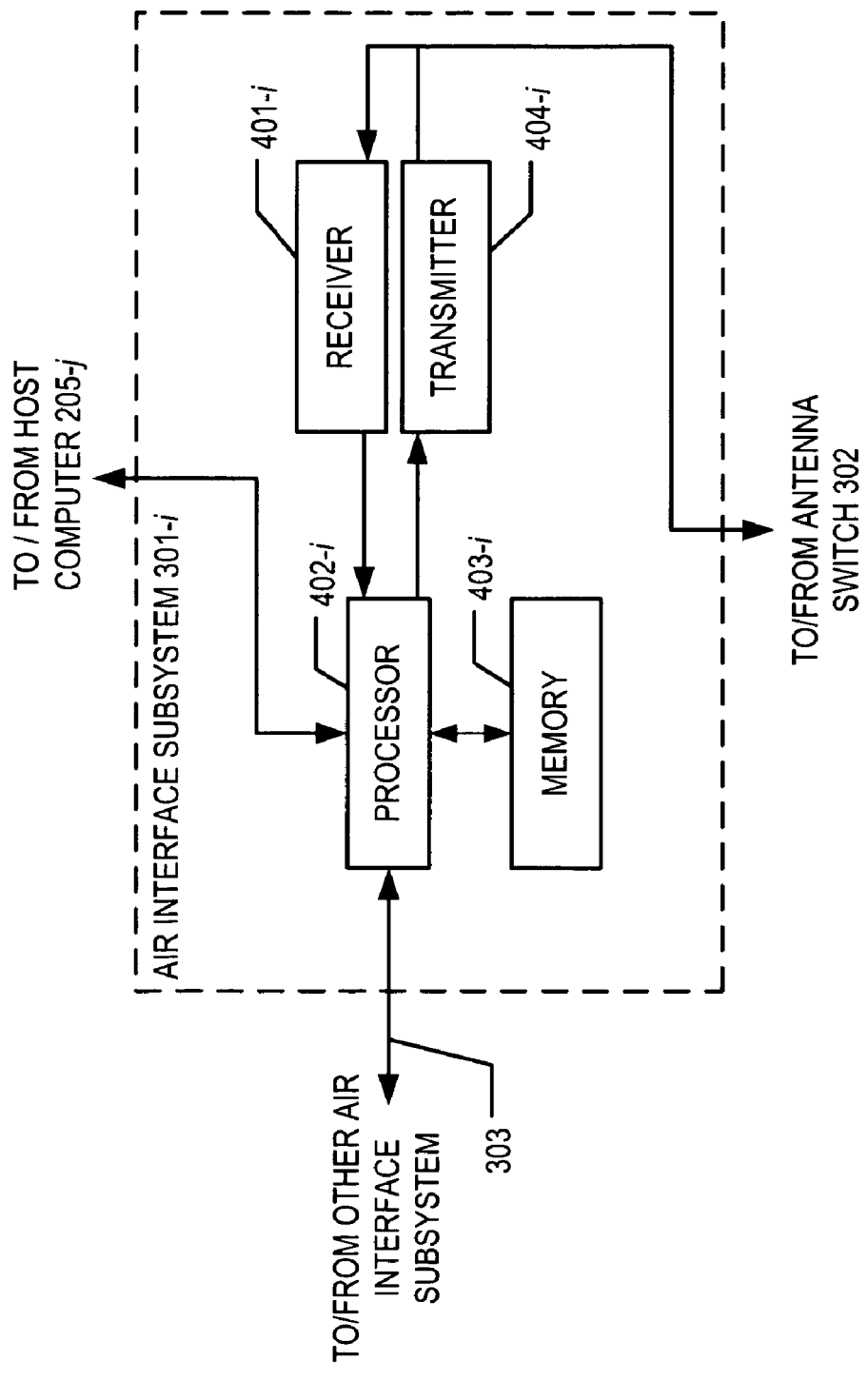
FIG. 4 depicts a block diagram of the salient components of air interface subsystem 301-i in accordance with the illustrative embodiment of the present invention.

FIG. 4 depicts a block diagram of the salient components of air interface subsystem 301-i in accordance with the illustrative embodiment of the present invention. Air interface subsystem 301-i comprises receiver 401-i, processor 402-i, memory 403-i, and transmitter 404-i, interconnected as shown.

Receiver 401-i is a circuit that is capable of receiving frames from shared-communications channel 206, in well-known fashion, and of forwarding them to processor 402-i. It will be clear to those skilled in the art how to make and use receiver 401-i.

Processor 402-*i* is a general-purpose processor that is capable of performing the tasks described below and with respect to FIGS. 5 through 9. It will be clear to those skilled in the art, after reading this specification, how to make and use processor 402-*i*.

Memory 403-*i* is capable of storing programs and data used by processor 402-*i*. It will be clear to those skilled in the art how to make and use memory 403-*i*.

Transmitter 404-*i* is a circuit that is capable of receiving frames from processor 402-*i*, in well-known fashion, and of transmitting them on shared-communications channel 206. It will be clear to those skilled in the art how to make and use transmitter 404-*i*.

The combination of receiver 401-*i* and transmitter 404-*i* constitutes the transceiver part of air interface subsystem 301-*i*.

Figure 5:
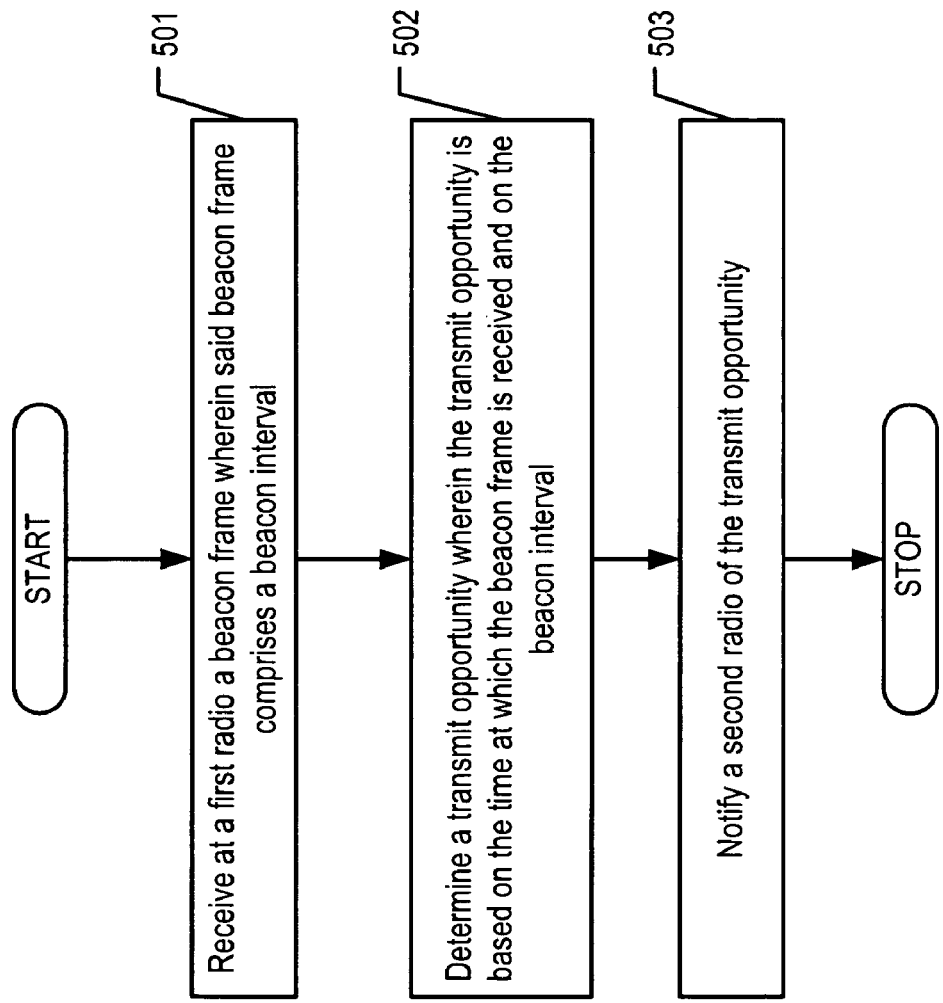
FIG. 5 depicts a flowchart of the salient tasks performed by air interface subsystem 301-i in accordance with the first illustrative embodiment of the present invention.
Figure 6:
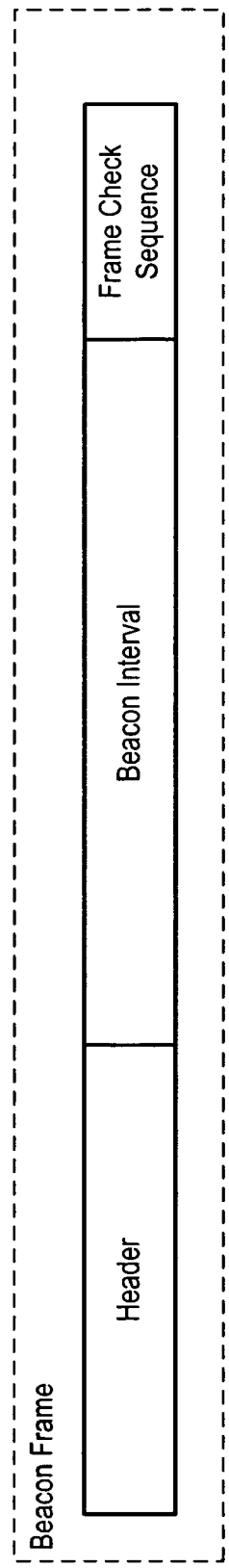
FIG. 6 depicts a schematic diagram of a beacon frame in accordance with the illustrative embodiment of the present invention.

FIG. 5 depicts a flowchart of the salient tasks performed by air interface subsystem 301-*i* in accordance with the first illustrative embodiment of the present invention. It will be clear to those skilled in the art which tasks depicted in FIG. 5 can be performed simultaneously or in a different order than that depicted. Although air interface subsystems 301-1 and 301-2 of dual station 204-1 are used as examples, it will be clear to those skilled in the art how to apply the tasks represented in FIG. 5 of the illustrative embodiment to other air interface subsystems.

Air interface subsystem 301-1 communicates in accordance with a first communications protocol (e.g., IEEE 802.11, etc.) using shared-communications channel 206. Air interface subsystem 301-2 communicates in accordance with a second communications protocol (e.g., Bluetooth, etc.), also using shared-communications channel 206.

At task 501, air interface subsystem 301-1 receives a beacon frame. In some embodiments, access point 201 transmits the beacon frame in well-known fashion. The beacon frame, depicted in FIG. 6, comprises a "beacon interval" as is known in the art. The beacon interval defines how far apart in time successive beacon frames are spaced. Air interface subsystem 301-1 can determine when subsequent beacon frames will arrive based on the arrival time of the beacon frame received at task 501 and on the beacon interval;

At task 502, air interface subsystem 301-1 determines the optimal time to relinquish control to air interface subsystem 301-2 (i.e., when to provide a "transmit opportunity" on shared-communications channel 206). Air interface subsystem 301-1 bases the transmit opportunity on when and how long it expects shared-communications channel 206 to be free of at least predictable traffic, such as beacon frames and the traffic generated by air interface subsystem 301-1.

For example, if air interface subsystem 301-1 calculates that the time until the next beacon frame transmission is relatively long and it does not have to transmit immediately on shared-communications channel 206, then air interface subsystem 301-1 determines a transmit opportunity to exist for air interface subsystem 301-2. Conversely, if air interface subsystem 301-1 calculates that the time until the next beacon frame transmission is relatively short or if air interface subsystem 301-1 is continuing to use shared-communications channel 206, then air interface 301-1 determines a transmit opportunity to not exist. The latter determination is based on the preference to avoid interfering with anticipated transmissions.

In some embodiments, air interface subsystem 301-1 also bases the transmit opportunity on receiving from air interface subsystem 301-2 at least one request to transmit. The request to transmit, if received from air interface subsystem 301-2, can arrive periodically or not. If the request to transmit is periodic, air interface subsystem 301-1 can determine in well-known fashion the periodicity of air interface subsystem 301-2's requests, predict when the next request to transmit will arrive, and proactively issue a transmit opportunity that coincides with the anticipated request to transmit.

It will be clear to those skilled in the art, after reading this specification, how to determine whether or not a transmit opportunity exists and, if a transmit opportunity exists, for how long.

In some embodiments, air interface subsystem 301-1 transmits a control frame (e.g., request_to_send, clear_to_send, etc.) to itself in well-known fashion, specifying a duration value based on the length of the transmit opportunity. The duration value, in combination with the virtual carrier sense mechanism known in the art, has the effect of muting the transceivers of other stations that communicate in accordance with the protocol used by air interface subsystem 301-1.

Air interface subsystem 301-1 can power down its transceiver after air interface subsystem 301-1 determines the transmit opportunity, or it can keep its transceiver turned on. Air interface subsystem 301-1 can direct the action of powering down at the transmitter part, the receiver part, or both parts of the transceiver.

At task 503, air interface subsystem 301-1 notifies air interface subsystem 301-2 of the transmit opportunity. The notification can occur through a direct link, such as interface 303, or an indirect link. The notification can be in the form of a message, a discrete signal, or other form. It will be clear to those skilled in the art how one subsystem can notify another subsystem of a transmit opportunity.

In some embodiments, air interface subsystem 301-1 notifies more than one co-existing air interface subsystem of the transmit opportunity. In other embodiments, air interface subsystem 301-1 selects a single air interface subsystem to notify for each transmit opportunity, out of multiple air interface subsystems. The selection criteria can be based on a round-robin approach, a random selection approach, the number of requests to transmit made by co-existing air interface subsystems, etc. It will be clear to those skilled in the art how to select the air interface subsystem or subsystems to notify.

Later in some embodiments, when the transmit opportunity is at an end, air interface subsystem 301-1 notifies air interface subsystem 301-2 of that event. Air interface 301-2 can determine the end of the transmit opportunity by knowing when the next beacon frame is to be transmitted or through some other criteria. It will be clear to those skilled in the art, after reading this specification, how to determine when the transmit opportunity is at an end.

Figure 7:
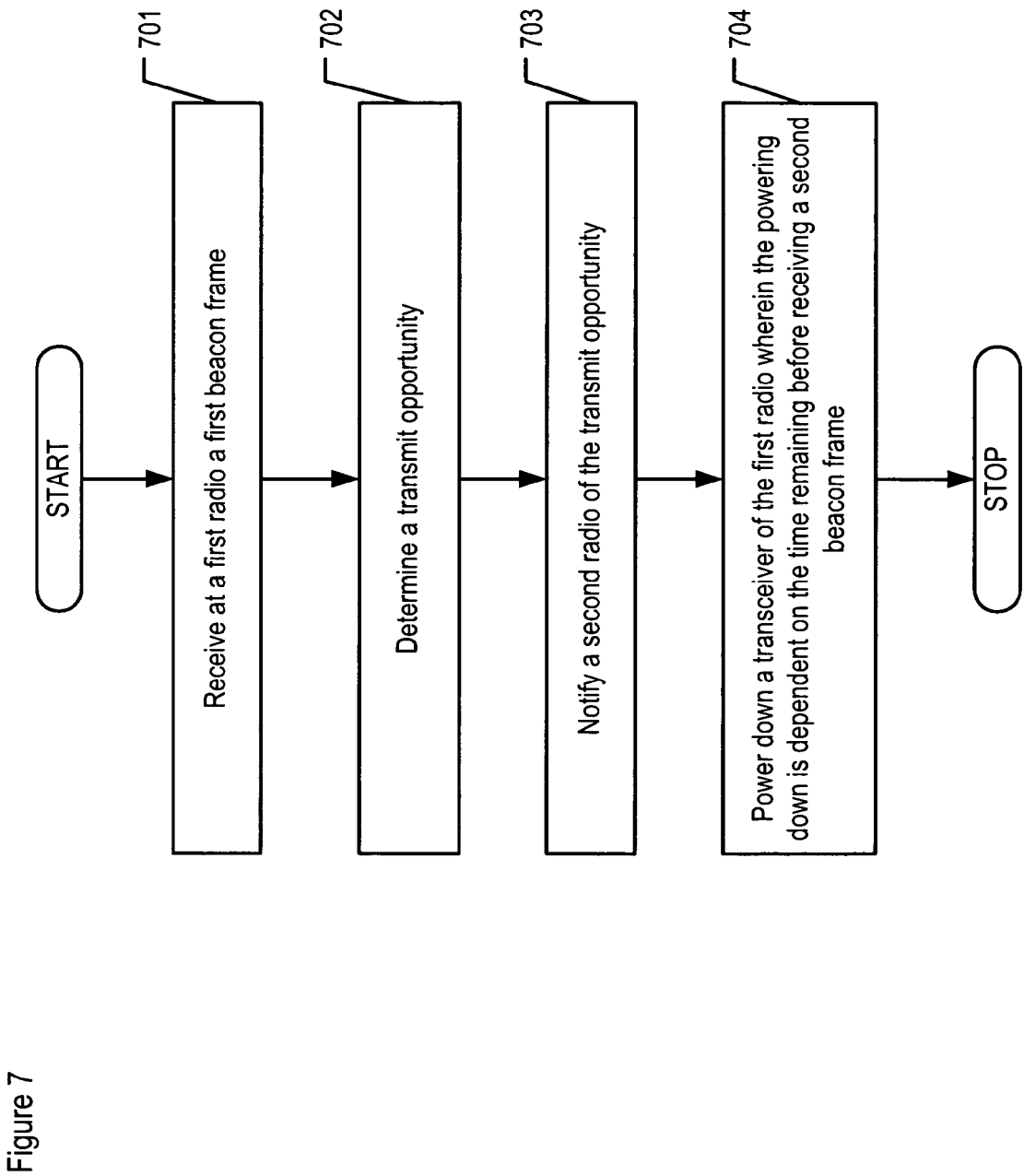
FIG. 7 depicts a flowchart of the salient tasks performed by air interface subsystem 301-i in accordance with the second illustrative embodiment of the present invention.

FIG. 7 depicts a flowchart of the salient tasks performed by air interface subsystem 301-*i* in accordance with the second illustrative embodiment of the present invention. It will be clear to those skilled in the art which tasks depicted in FIG. 7 can be performed simultaneously or in a different order than that depicted. Although air interface subsystems 301-1 and 301-2 of dual station 204-1 are used as examples, it will be clear to those skilled in the art how to apply the tasks represented in FIG. 7 of the illustrative embodiment to other air interface subsystems.

Air interface subsystem 301-1 communicates in accordance with a first communications protocol (e.g., IEEE 802.11, etc.) using shared-communications channel 206. Air interface subsystem 301-2 communicates in accordance with a second communications protocol (e.g., Bluetooth, etc.), also using shared-communications channel 206.

At task 701, air interface subsystem 301-1 receives a first beacon frame. In some embodiments, access point 201 transmits the beacon frame in well-known fashion. The first beacon frame comprises a "beacon interval" as is known in the art. Air interface subsystem 301-1 can determine when subsequent beacon frames will arrive based on the arrival time of the first beacon frame received at task 701 and on the beacon interval.

At task 702, air interface subsystem 301-1 determines the optimal time to relinquish control to air interface subsystem 301-2 (i.e., when to provide a "transmit opportunity" on shared-communications channel 206). Air interface subsystem 301-1 can base the transmit opportunity on when and how long it expects shared-communications channel 206 to be free of at least predictable traffic, such as beacon frames and the traffic generated by air interface subsystem 301-1.

In some embodiments, air interface subsystem 301-1 can also base the transmit opportunity on receiving from air interface subsystem 301-2 at least one request to transmit. The request to transmit, if received from air interface subsystem 301-2, can arrive periodically or not. If the request to transmit is periodic, air interface subsystem 301-1 can determine the periodicity of air interface subsystem 3012's requests in well-known fashion, predict when the next request to transmit will arrive, and proactively declare a transmit opportunity that coincides with the anticipated request to transmit.

It will be clear to those skilled in the art, after reading this specification, how to determine whether or not a transmit opportunity exists and, if a transmit opportunity exists, for how long.

In some embodiments, air interface subsystem 301-1 transmits a control frame (e.g., request_to_send, clear_to_send, etc.) to itself in well-known fashion, specifying a duration value based on the length of the transmit opportunity. The duration value, in combination with the virtual carrier sense mechanism known in the art, has the effect of muting the transceivers of other stations that communicate in accordance with the protocol used by air interface subsystem 301-1.

At task 703, air interface subsystem 301-1 notifies air interface subsystem 301-2 of the transmit opportunity. Notification can occur through a direct link, such as interface 303, or an indirect link. It will be clear to those skilled in the art how one subsystem can notify another subsystem of a transmit opportunity.

In some embodiments; air interface subsystem 301-1 notifies more than one co-existing air interface subsystem of the transmit opportunity. In other embodiments, air interface subsystem 301-1 selects a single air interface subsystem to notify for each transmit opportunity, out of multiple air interface subsystems. The selection criteria can be based on a round-robin approach, a random selection approach, the number of requests to transmit made by co-existing air interface subsystems, etc. It will be clear to those skilled in the art how to select the air interface subsystem or subsystems to notify.

At task 704, air interface subsystem 301-1 powers down its transceiver. Air interface subsystem 301-1 can direct the action of powering down at transmitter 404-i, receiver 401-i, or both transmitter 404-i and receiver 401-i (i.e., one or both parts of the transceiver). The length of time that the transceiver is powered down depends on the time remaining before air interface subsystem 301-1 receives a second beacon frame. The length of time can also depend on the time it takes the transceiver to recover from being powered down (i.e., to transition electronically from a powered down to a powered up state).

Later in some embodiments, when the transmit opportunity is at an end, air interface subsystem 301-1 notifies air interface subsystem 301-2 of that event. Air interface 301-2 can determine the end of the transmit opportunity by knowing when the next beacon frame is to be transmitted or through some other criteria. It will be clear to those skilled in the art, after reading this specification, how to determine when the transmit opportunity is at an end.

Figure 8:
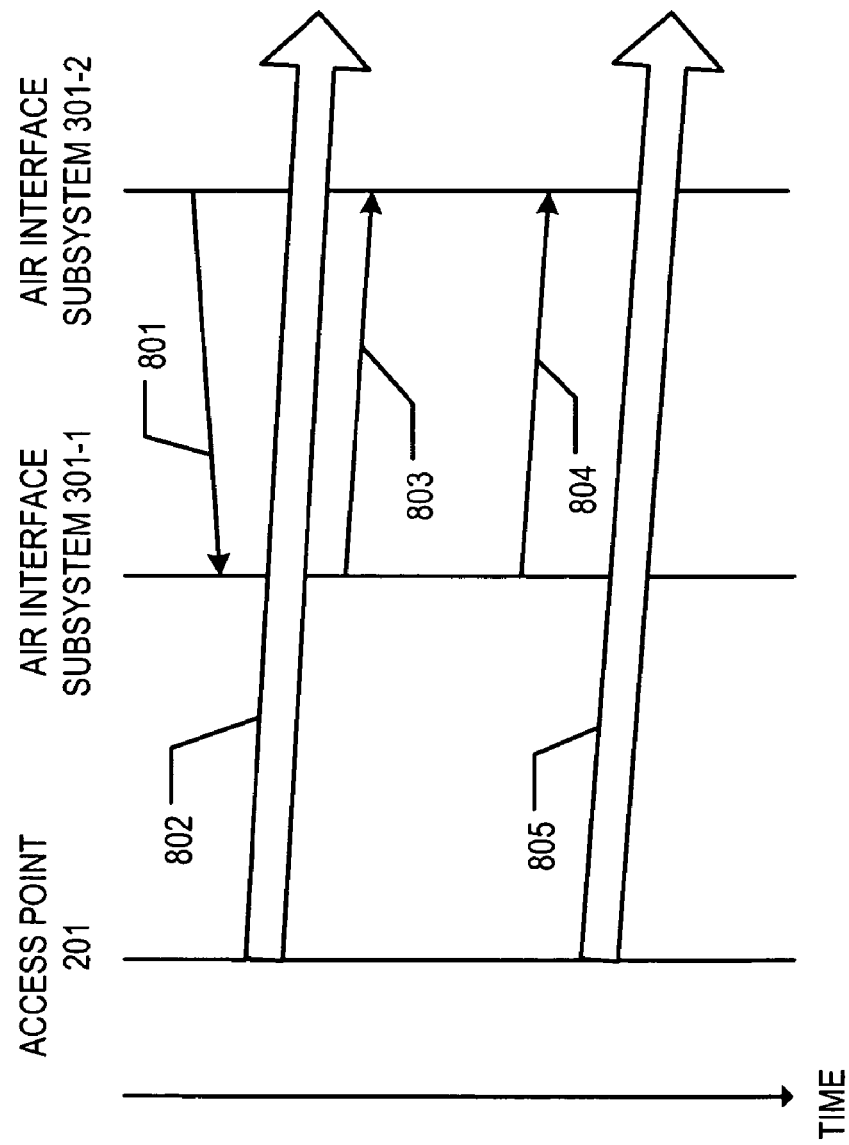
FIG. 8 depicts a message flow diagram of message transmissions between air interface subsystems in accordance with the illustrative embodiment of the present invention.

FIG. 8 depicts a message flow diagram of message transmissions between air interface subsystems in accordance with the illustrative embodiment of the present invention. For illustrative purposes, air interface 301-1 and access point 201 operate in accordance with the IEEE 802.11 set of protocols and air interface 301-2 operates in accordance with the Bluetooth set of protocols. Although air interface subsystems 301-1 and 301-2 of dual station 204-1 are used as examples, it will be clear to those skilled in the art how to apply the tasks represented in FIG. 8 of the illustrative embodiment to other air interface subsystems.

With message 801, air interface subsystem 301-2 transmits to air interface subsystem 301-1 a request to use shared-communications channel 206.

With message 802, access point 201 broadcasts a beacon frame comprising a beacon interval.

With message 803, air interface subsystem 301-1, having received the beacon frame, notifies air interface subsystem 301-2 of the transmit opportunity (i.e., the opportunity to use shared-communications channel 206). Air interface subsystem 301-2 might take advantage of the transmit opportunity by transmitting one or more frames to another station (e.g., second protocol station 203-2, etc.), or it might not.

With message 804, air interface subsystem 301-1 notifies air interface subsystem 301-2 that the transmit opportunity is at an end.

With message 805, access point 201 broadcasts the next beacon frame, also comprising a beacon interval.

Figure 9:
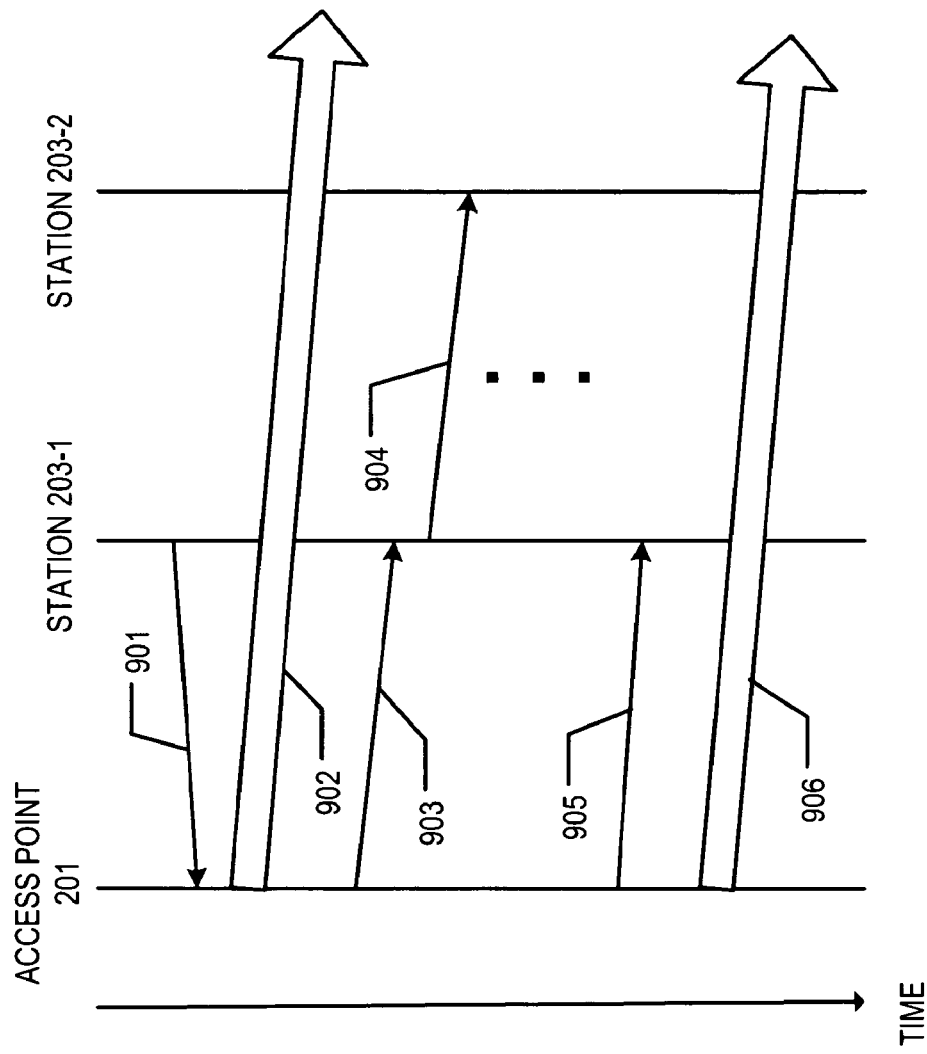
FIG. 9 depicts a message flow diagram of message transmissions between stations in accordance with the illustrative embodiment of the present invention.

FIG. 9 depicts a message flow diagram of message transmissions between stations in accordance with the illustrative embodiment of the present invention. For illustrative purposes, access point 201 operates in accordance with both the IEEE 802.11 and Bluetooth sets of protocols, and second protocol stations 203-1 and 203-2 operate in accordance with the Bluetooth set of protocols. Although second protocol stations 203-1 and 203-2 are referred to as examples, it will be clear to those skilled in the art how to apply the tasks represented in FIG. 9 of the illustrative embodiment to other stations.

With message 901, second protocol station 203-1 transmits to access point 201 a request to use shared-communications channel 206.

With message 902, access point 201 broadcasts a beacon frame comprising a beacon interval.

With message 903, access point 201, aware of the beacon frame timing and beacon interval, notifies second protocol station 203-1 of the transmit opportunity (i.e., the opportunity to use shared-communications channel 206).

Second protocol station 203-1 takes advantage of the transmit opportunity by transmitting one or more frames to another station (e.g., message 904 transmitted to second protocol station 203-2, etc.).

With message 905, access point 201 notifies second protocol station 203-1 that the transmit opportunity is at an end.

With message 906, access point 201 broadcasts the next beacon frame, also comprising a beacon interval.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
means for receiving, via a shared-communications channel, a beacon frame in accordance with a first communications protocol, the beacon frame comprising a beacon interval; and
means for sending a notification of a transmit opportunity for transmissions in accordance with a second communications protocol, wherein the transmit opportunity is based at least in part on the beacon interval and a time at which the beacon frame is received.

2. The apparatus of claim 1, further comprising means for powering down a transceiver in response to the means for sending the transmit opportunity.

3. The apparatus of claim 1, further comprising means for determining that the transmit opportunity has ended.

4. The apparatus of claim 1, further comprising means for muting the means for receiving in response to receiving the transmit opportunity.

5. The apparatus of claim 1, further comprising means for receiving at least one request to transmit, wherein the transmit opportunity is further based at least in part on the at least one request to transmit.

6. The apparatus of claim 5, wherein the means for receiving at least one request to transmit comprise means for receiving periodic transmission requests.

7. The apparatus of claim 1, further comprising:
means for determining the transmit opportunity has ended; and
wherein the means for receiving a first beacon frame further comprise:
means for receiving a second beacon frame in response to the means for determining the transmit opportunity has ended.

8. The apparatus of claim 1, further comprising means for determining whether to allow the transmit opportunity in accordance with the second communications protocol.

9. The apparatus of claim 8, wherein the means for determining whether to allow the transmit opportunity comprise means for determining whether to allow the transmit opportunity based at least in part on the beacon interval and expected transmissions in at least one of the first or second communication protocols.

10. The apparatus of claim 1, further comprising means for transmitting a control frame having a duration based at least in part on the length of the transmit opportunity, wherein the control frame is configured to mute transceivers of stations that communicate in accordance with the first communication protocol.

11. The apparatus of claim 1, further comprising means for transmitting a notification of an end of the transmit opportunity.

12. An article of manufacture including a computer-readable medium having instructions stored thereon that, upon execution by a processor, cause the processor to perform operations comprising:
receiving, at a transceiver via a shared-communications channel, a beacon frame in accordance with a first communications protocol, the beacon frame comprising a beacon interval; and
sending a notification of a transmit opportunity in accordance with a second communications protocol, wherein the transmit opportunity is based at least in part on the beacon interval and a time at which the beacon frame is received.

13. The article of manufacture of claim 12, wherein the operations further comprise in response to sending the transmit opportunity, powering down the transceiver.

14. The article of manufacture of claim 12, wherein the operations further comprise sending a notification that the transmit opportunity is at an end.

15. The article of manufacture of claim 12, wherein the operations further comprise muting the transceiver based at least in part on the transmit opportunity.

16. The article of manufacture of claim 12, wherein the operations further comprise:
receiving at least one request to transmit; and
wherein the transmit opportunity is further based at least in part on the at least one request to transmit.

17. The article of manufacture of claim 16, wherein the receiving at least one request to transmit comprises receiving periodic transmission requests.

18. The article of manufacture of claim 12, wherein the operations further comprise:
determining the transmit opportunity has ended; and
responsively receiving, at the transceiver via the shared-communications channel, a second beacon frame.

19. The article of manufacture of claim 12, wherein the operations further comprise determining whether to allow the transmit opportunity in accordance with the second communications protocol.

20. The article of manufacture of claim 19, wherein the determining whether to allow the transmit opportunity comprises determining whether to allow the transmit opportunity based at least in part on the beacon interval and expected transmissions in at least one of the first or second communication protocols.

21. The article of manufacture of claim 12, wherein the operations further comprise transmitting a control frame having a duration based on the length of the transmit opportunity, wherein the control frame is configured to mute transceivers of stations that communicate in accordance with the first communication protocol.

22. The article of manufacture of claim 12, wherein the operations further comprise transmitting a notification of an end of the transmit opportunity.

23. A method comprising:
receiving, at a first air interface subsystem via a shared-communications channel, a beacon frame in accordance with a first communications protocol, the beacon frame comprising a beacon interval;
determining, at the first air interface subsystem, whether to allow the transmit opportunity in accordance with the second communications protocol; and
sending, from the first air interface subsystem to a second air interface subsystem, a notification of a transmit opportunity for transmissions in accordance with a second communications protocol, wherein the transmit opportunity is based at least in part on the beacon interval and a time at which the beacon frame is received.

24. The method of claim 23, wherein the determining whether to allow the transmit opportunity comprises determining whether to allow the transmit opportunity based at least in part on the beacon interval and expected future transmissions in at least one of the first or second communication protocols.

25. The method of claim 23, further comprising receiving periodic transmission requests from the second air interface subsystem, and wherein the sending a notification of a transmit opportunity comprises issuing the transmit opportunity coincidentally with an anticipated periodic request.

26. The method of claim 23, further comprising transmitting, from the first air interface subsystem, a control frame having a duration based on the length of the transmit opportunity, wherein the control frame is configured to mute transceivers of stations that communicate in accordance with the first communication protocol.

27. The method of claim 23, further comprising transmitting a notification of an end of the transmit opportunity from the first air interface subsystem to the second air interface subsystem.

28. An apparatus comprising:
a first air interface subsystem configured to:
  receive, via a shared-communications channel, a beacon frame in accordance with a first communications protocol, the beacon frame comprising a beacon interval; and
  determine whether to allow the transmit opportunity in accordance with the second communications protocol;
  send, to a second air interface subsystem, a notification of a transmit opportunity for transmissions in accordance with a second communications protocol, wherein the transmit opportunity is based at least in part on the beacon interval and a time at which the beacon frame is received.

29. The apparatus of claim 28, wherein the determining whether to allow the transmit opportunity comprises determining whether to allow the transmit opportunity based at least in part on the beacon interval and expected future transmissions in at least one of the first or second communication protocols.

30. The apparatus of claim 28, wherein the first air interface subsystem is further configured to:
  receive periodic transmission requests from the second air interface subsystem; and
  issue the transmit opportunity coincidentally with an anticipated periodic request.

31. The apparatus of claim 28, wherein the first air interface subsystem is further configured to transmit a control frame having a duration based at least in part on the length of the transmit opportunity, wherein the control frame is configured to mute transceivers of stations that communicate in accordance with the first communication protocol.

32. The apparatus of claim 28, wherein the first air interface subsystem is further configured to transmit a notification of an end of the transmit opportunity to the second air interface subsystem.

* * * * *

UNITED STATES PATENT AND TRADEMARK OFFICE
CERTIFICATE OF CORRECTION

| | | |
|---|---|---|
| PATENT NO. | : 8,036,193 B2 | Page 1 of 1 |
| APPLICATION NO. | : 12/691693 | |
| DATED | : October 11, 2011 | |
| INVENTOR(S) | : Godfrey | |

It is certified that error appears in the above-identified patent and that said Letters Patent is hereby corrected as shown below:

Column 1, line 26, delete "Host,"." and insert -- Host". --.

Column 11, line 15-16, in Claim 28, delete "interval; and" and insert -- interval; --.

Column 11, lines 18-19, in Claim 28, delete "protocol;" and insert -- protocol; and --.

Signed and Sealed this
Seventeenth Day of April, 2012

David J. Kappos
*Director of the United States Patent and Trademark Office*